United States Patent [19]

Viner

[11] Patent Number: 4,761,965

[45] Date of Patent: Aug. 9, 1988

[54] EVAPORATIVE ROOF COOLING SYSTEM

[76] Inventor: Stephen G. Viner, 1066 S. Ogden Dr., Los Angeles, Calif. 90019

[21] Appl. No.: 65,850

[22] Filed: Jun. 24, 1987

[51] Int. Cl.$^4$ ................................................ F28D 3/00
[52] U.S. Cl. ...................................... 62/171; 62/259.4; 374/136
[58] Field of Search ............... 62/259.4, 171; 261/129; 374/136, 109, 29, 185; 236/91 G, 91 R, DIG. 12

[56] References Cited

U.S. PATENT DOCUMENTS

| | | | |
|---|---|---|---|
| 1,386,618 | 8/1921 | Hartnig | 236/DIG. 12 |
| 2,266,321 | 12/1941 | Holder | 62/259.4 X |
| 2,506,936 | 5/1950 | Murray | 62/259.4 X |
| 3,861,624 | 1/1975 | Lear | 236/91 G |
| 4,559,789 | 12/1985 | Riek | 62/171 X |

Primary Examiner—William E. Wayner
Attorney, Agent, or Firm—Philip D. Junkins

[57] ABSTRACT

An evaporative roof cooling system for placement upon a roof surface exposed to relatively high levels of solar radiation. The system includes water distribution piping and a plurality of mist/spray nozzles positioned on the roof surface for supplying a uniform spray of water thereover to lay down a substantially uniform thin film of water on the roof surface. A solenoid-controlled valve controls the supply of water to the system over periods during which the temperature of the roof surface is measured to be within a predetermined temperature range. A thermistor, encapsulated in an expoxy block, is affixed to the roof surface and monitors and measures the actual roof temperature. Cooling systems control circuitry, in electric communication with the thermistor and the solenoid-controlled valve, compares the electric resistance value developed by the thermistor and a range of current values related to the predetermined temperature range and directs the opening of such valve when the termister senses the high point temperature of such range and the closing of such valve when the thermister senses the low point temperature of such range whereby the mist/sprays of water discharged from the nozzles evaporatively cool the roof surface.

4 Claims, 2 Drawing Sheets

EVAPORATIVE ROOF COOLING SYSTEM

BACKGROUND OF THE INVENTION

The present invention relates to roof cooling systems for residential, commercial and industrial buildings and particularly to roof cooling systems which reduce the heat load on internal air conditioning equipment. More particularly, the invention relates to evaporative roof cooling to substantially eliminate the radiant or solar roof heat load imposed on buildings, and to reduce inside temperatures in buildings without internal air conditioning.

A number of prior art patents have disclosed exterior roof cooling devices and systems for cooling the interior of buildings. In Barnes U.S. Pat. No. 1,808,829 the inventor proposes that a water absorbent material, such as burlap or canvas, be applied to the roof and side walls from a high point of the building to its base area with the travel of the water through the facing material providing cooling of the interior of the building. Holder in his U.S. Pat. No. 2,266,321 discloses a roof cooling system comprised of: a plurality of spray heads with water supply conduit means; automatic valve means for the conduit means; and control means for the valve means including a heat responsive bulb means enclosed in a ventilated housing mounted on the roof. The expansible fluid within the sealed bulb responds to temperature variation of the bulb to set up varying pressure conditions at the central means for actuating the automatic valve thereby controlling the flow or non-flow of water through the conduit means to the spray heads. The temperature of the heat responsive bulb is related to the atmospheric temperature of the space surrounding the bulb within its ventilated housing. In Gerhart U.S. Pat. No. 2,660,863 the inventor proposes a roof cooling system including the use of a porous hose, such as a canvas tube, to diffuse water slowly near and along the ridge of the roof without producing a spray. The diffusion hose is so arranged as to maintain a trickle of water over the whole roof or an apprpriate portion thereof. Unevaporated water is collected in the roof's gutters and leaders and delivered to a sump for recirculation with make-up water.

It is an object of the present invention to provide an improved roof cooling and heat dissipation system for residential, commercial and industrial buildings to economically lower the under roof temperature of such structures, and thereby reduce the air conditioning loads and costs thereof.

It is a further object of the invention to provide an evaporative roof cooling system, including water conduits with associated mist/spray nozzles, and a programmed water supply control system, including an electronic temperature sensor for accurately monitoring and measuring the temperature of the roof, to cool the roof in part by water mist interception of solar radiation to the roof, and in part by pulling heat from the roof through the evaporation of water sprayed thereon.

Another object of the invention is to provide an evaporative roof cooling system including a control system responsive to the temperature of the roof which directs the cyclic spraying of a mist/spray of water in a uniform pattern over the surface of the roof between a high and low temperature range of roof temperatures.

Yet another object of the invention is to provide an improved method for the controlled cyclic application of a mist/spray of water in a uniform pattern over the surface of a roof exposed to high levels of solar radiation to evaporatively cool the roof between high and low temperature set points of roof temperatures as monitored and measured by an electronic temperature sensor.

These and other objects and advantages of the invention will become more apparent from the following summary and detailed descriptions taken in conjunction with the accompanying drawing figures.

SUMMARY OF THE INVENTION

The present invention relates to a system and method for the evaporative roof cooling of residential, commercial and industrial buildings, factories and warehouses, to economically lower the under roof temperatures of such structures and thereby reduce the cooling loads and costs thereof. The system includes a unique arrangement of roof water pipes or conduits with an array of nozzles for applying a uniform pattern of water as a mist/spray over the surface of a roof exposed to high levels of solar radiation. The mist/spray of water evaporatively cools the roof between high and low temperature set points of roof temperatures as accurately monitored and measured by an electronic temperature sensor interacting with a control system for the roof cooling system. The control system includes a pressure regulator (with a pressure gauge) to assure a proper water pressure level at the nozzles to control the size of the mist/spray pattern and regulate against large water pressure surges in the water supply line. The control system also cycles the supply of water on/off for specified periods during the time the system is operating between the high and low temperature set points so that the water reaching the roof surface is applied as a thin film to merely wet the roof and then rapidly evaporate so that puddling of water on the roof surface is minimized.

BRIEF DESCRIPTION OF THE DRAWING FIGURES

In the accompanying drawing sheets:

Figure 4:
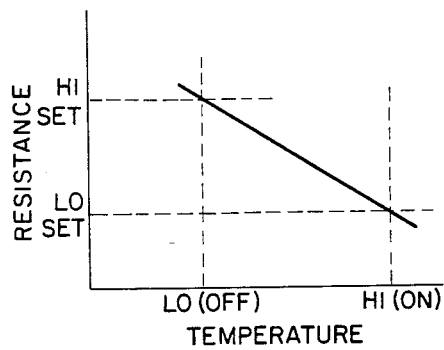
Figure 5:
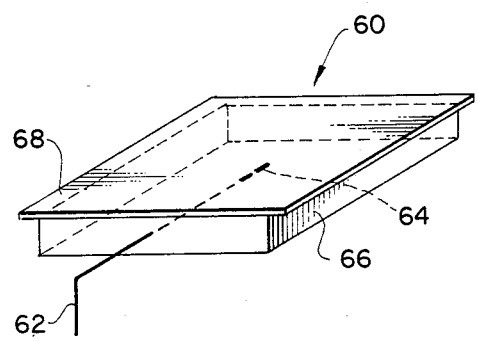

FIG. 4 is a simplified diagram showing the relationship between control system resistance measurements at and between low set and high set points of the control system and the low temperature "off" and high temperature "on" points of the system; and FIG. 5 is a perspective view of the temperature sensor comprising a component of the evaporative roof cooling system of the invention and utilized to sense the actual roof temperature as a system controlling measurement.

DETAILED DESCRIPTION OF THE INVENTION

Figure 1:
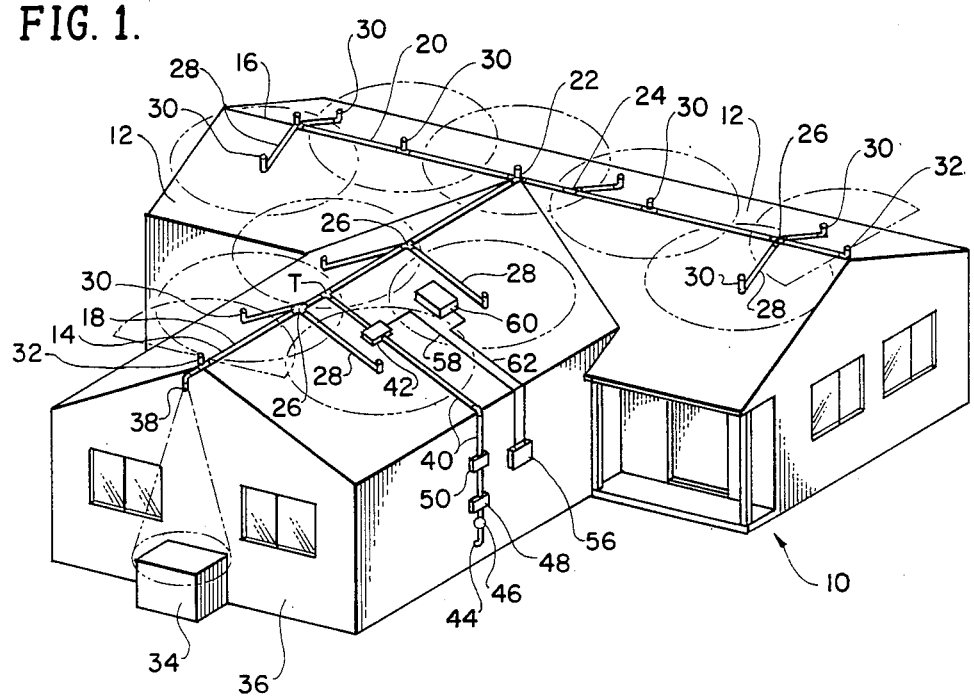
FIG. 1 is a perspective view of a residential building with an evaporative cooling system installed on the roof thereof in accordance with the present invention.

Referring now to FIG. 1 of the drawings there is a represented, in a perspective view, a building 10 including sloping roof surfaces 12. Upon the roof ridges 14 and 16 of the building there is mounted main water pipes or conducts 18 and 20, respectively, joined by T-fittings 24 or cross-fittings 26 from which project branch pipes or conduits 28. The pipes utilized throughout the system should be ultra-violet stabilized PVC pipe since standard PVC pipe and pipe made of other plastic material degrades with constant exposure to solar radiation. Mounted to main conduits 18 and 20 and their branch pipes or conduits 28 are a multitude of spray heads which may comprise basic 360° mist/spray nozzles 30 or 180° pattern mist/spray nozzles 32. The main pipes, branch pipes and their one or more mist/spray nozzles are disposed in a predetermined pattern over the roof surfaces so that cooling water in the form of a mist/spray covers the entire roof surfaces uniformly when the evaporative roof cooling system is operating. As shown in FIG. 1, a ground mounted air conditioning unit 34 is located adjacent building wall 36. To precool the air entering air conditioner 34 the main pipe 18 is provided at its terminal end with a fan-shaped mist/spray nozzle 38 which is designed and oriented to direct the water mist/spray emanating from such nozzle to the air conditioning unit while generally keeping water off the adjacent wall. All of the mist/spray nozzles should be constructed of solid brass and should incorporate a 100 mesh stainless steel filter with a built-in ball check valve to assure that there is no drainage from the system during "off" cycles.

In accordance with the present invention, the roof piping system is supplied with water under pressure thorugh a supply pipe 40 which, as shown, rises from the side of the building, traversing a roof surface, and includes near its upper end a solenoid operated control valve 42 located in pipe 40 near the juncture T of supply pipe 40 and main pipe 18. Water is supplied to the evaporative roof cooling system by a typical water outlet 44 near the ground level on the outside of the building (home, office building or factory) with the water flow initially controlled by a manually operated gate-type shut-off valve 46. Connected next in the system is a ground level coarse filter 48 which is preferably of the easy-to-clean "Y" type utilizing a 24 mesh stainless steel filter element to keep the coarser "junk" material found in some water supplies out of the system's solenoid valve and the mist/spray nozzles. The purpose of shut-off valve 46 and filter 48 is to allow cleaning of the filter and draining of the system at the end of each hot weather season. The shut-off valve 46 and ground level filter 48 should each be consructed of brass and stainless steel components to inhibit corrosion.

Following filter 48 in the water supply piping 40 for the roof cooling system is a regulator-gauge 50 which is preferably of brass construction and is manually adjustable. The purpose of the regulator-guage is two-fold, i.e., it is used to adjust (regulate) the water pressure in the system and thus the size of the mist/spray patterns of the nozzles, and to protect the system (particularly the solenoid control valve 42) against any sudden large surge in water pressure. An all weather pressure gauge on the regulator reads the regulated pressure of the water being fed to the system.

The final component of the water supply piping system of the roof cooling system of the invention, before water is introduced to the pipe mains 18 and 20, is the previously mentioned solenoid operated control valve 42. Preferably valve 42 is of brass body construction, operates on 24 volt direct current, and should be rated for continuous all-weather duty. Such valve, mounted in a rain-proof enclosure near the terminal end of the supply pipe 40, controls the flow of water to the system of main pipes and branch pipes 52 and system of mist/spray nozzles 54 under the direction of the control system 56 all as described hereinafter with reference to FIG. 3. The solenoid control valve 42 is operated in response to electrical direction received from the control system 56 via control leads 58. The control system 56 receives actual roof temperature measurements as electric resistance values from a thermistor type temperature sensor 60 via electrical leads 62. The temperature sensor 60, located on the roof to be evaporatively cooled, in accordance with the present invention, includes (as particularly shown in FIG. 5) a temperature sensing solid-state device (thermistor 64) encapsulated in an expoxy resin block 66 that exhibits high thermal conductivity. The epoxy block 66 is cemented to the roof surface by the same type of high thermal conductive epoxy so that the temperature of the roof is conducted rapidly to the temperature sensing device 64 within the block. Mounted on the top of the sensor block is a reflective cover or capping sheet 68 of reflective material so that the sensor measures only the actual roof temperature and not direct heat from the sun.

Figure 2:
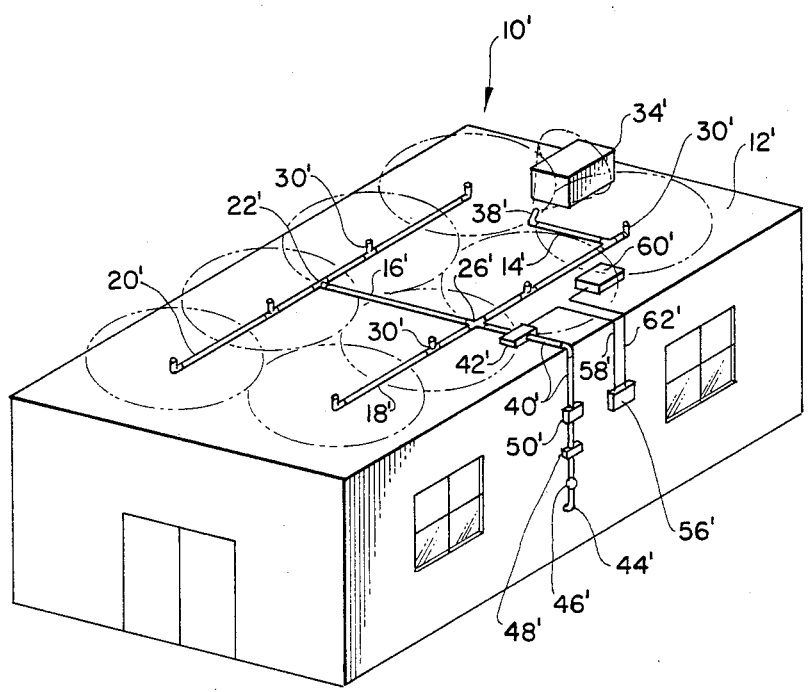
FIG. 2 is a perspective view of a flat roof industrial building with an evaporative cooling system of the invention installed thereon.

Referring now to FIG. 2 of the drawings there is represented, in a perspective view, an industrial building 10' including a flat roof 12'. Upon the roof there is mounted main water pipes or conduits 18' and 20' joined by interconnecting pipe 16'. Main pipe 20' is connected to pipe 16' by a T-fitting 22' with main pipe 18' connected to pipe 16' by a cross-fitting 26'. As in the case of the roof piping system of FIG. 1, the pipes and pipe fittings utilized on the flat roof 12' of building 10' should be made of ultra-violet stabilized PVC. Mounted to main conduits 18' and 20' are spray heads which may comprise basic 360° mist/spray nozzles 30'. The main pipes 18' and 20' and interconnecting pipe 16', with their mist/spray nozzles are disposed in a predetermined pattern over the roof surface so that cooling water in the form of a mist/spray covers substantially the entire roof surface in uniform fashion when the roof cooling system is operating. Also mounted on the roof surface 12' of the building 10' is an air conditioning unit 34'. To precool the air entering such unit the main pipe 18' is provided near its terminal end with a branch pipe 14' and a mist/spray nozzle 38' which is designed and oriented to direct a cone-shaped water mist/spray emanating from such nozzle to cover the air conditioning unit 34'.

As in the case of the evaporative roof cooling system as illustrated in FIG. 1, the flat roof system of FIG. 2 is supplied with water under pressure through a supply pipe 40' which, as shown, rises from the side of the building 10', traverses a portion of roof 12', and includes near its juncture with cross-fitting 26' a solenoid operated control valve 42'. Water is supplied to the evaporative roof cooling system by water outlet 44' near the ground level on the outside of the building with water flow initially controlled by a manually operated gate-type shut-off valve 46'. Next in supply pipe 40' of the system is a ground level coarse filter 48' followed a regulator-gauge 50' and finally the solenoid control valve 42'. The valve 42' is operated in response to electrical direction received from the control system 56' via control leads 58' and the control system 56' receives actual roof temperature measurements as electrical resistance valves from a thermister type temperature sensor 60' like sensor 60 of FIG. 1 and as particularly shown in FIG. 5.

Figure 3:
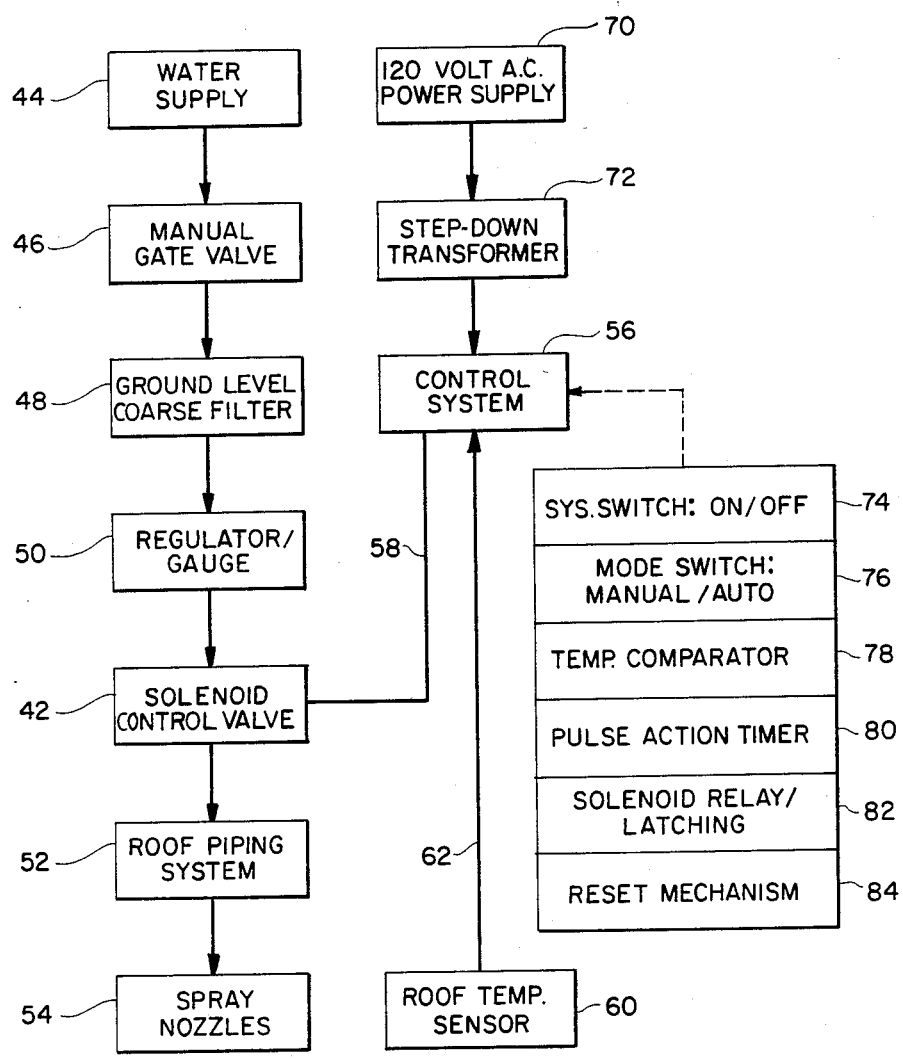
FIG. 3 is a block diagram of the principal components of the evaporative roof cooling system of the invention.

Referring now to FIG. 3, it is to be noted that the control system 56 (and control system 56') for the evaporative roof cooling system of the invention operates from a standard 110–120 volt AC power source 70 through a step-down transformer 72 which drops the voltage input to 24 volts AC with such current converted within system 56 (solid-state) to 24 volts DC. The control system (56 or 56'), fully contained within a watertight control box, includes: a system "on/off" switch 74; a "manual/auto" mode switch 76; temperature comparator circuitry 78; a pulse action timer 80; solenoid relay/latching circuitry 82; and a reset mechanism 84. The control system 56 (or 56') within its control box is protected by a replacable fuse.

In FIG. 4 there is shown a simplified diagram illustrating the relationship between the control system electrical resistance value at and between low set and high set points of the control system and the low temperature "off" and high temperature "on" points of the system.

The present evaporative roof cooling system is particularly intended to relieve the work load of interior air conditioners by reducing inside temperatures by 10° to 15° F. As side benefits, the system reduces fire danger and increases roof life by decreasing roof temperatures by as much as 70° F. It is well established that 1 gallon of water evaporating absorbs 8,265 Btu of heat. Thus, about one and one-half gallons of evaporating water will absorb the equivalent of 1 ton of air conditioning. If water is applied to a hot roof as a thin film (merely enough to wet the roof surface) and allowed to evaporate, the roof cools to within 10° to 12° F. of the wet bulb temperature. This means that where the wet bulb temperature is, for example, 76° F. a maximum wet roof temperature of 86° to 88° F. may be attained instead of a dry roof temperature of 160° to 170° F. Such lower roof temperature results in under roof temperatures of 82° to 84° F. and thus virtual elimination of solar roof load thru-put.

In typical "auto" mode operation of the present roof cooling system the control system is set for high temperature actuation and low temperature turn off of the water flow to the mist/spray nozzles. In the morning, as soon as the sensed roof temperature reaches the "high temp" setting, the control system 56 (or 56') activates solenoid control valve 42 (or 42') allowing the system of pipes and nozzles to fill with water to the pressure determined by regulator 50 (or 50'). The water begins to spray as a mist which intercepts much of the heat radiation before it reaches the roof surface. The water that reaches the roof begins to cool the surface as the heat in the roof transfers to the cooler water and the heated water begins to evaporate. As the sprayed water continues to evaporate, the roof surface loses more and more heat energy and its temperature is lowered to the "low temp" point. Since the control system's temperature sensor block 60 (or 60') is in direct intimate contact with the roof, and within the spray pattern, the control system senses this "low temp" setting and turns off the water flow via solenoid control valve 42 (or 42'). The control system, however, performs an additional function between the time that water flows into the system and the time when it is turned off. In order to insure a more uniform pattern of water on the roof surface, during the solenoid's "on" cycle, the control system pulses the solenoid valve on and off in a 1 minute cycle pattern. This cycle pattern helps insure that no water puddling takes place and that only a thin film of water is deposited on the roof surface to obtain the maximum degree of evaporative efficiency. As this thin film of water on the roof surface evaporates further roof cooling takes place until all of the water is evaporated. The roof surface then begins to heat up again until the "high temp" setting is again reached and the cycle begins anew. As previously indicated, roof temperatures of 170° F. can be expected, and by reducing the roof temperature to a maximum of 88° F. by application of the evaporative roof cooling system of the invention, the system picks up as much as 90% of the solar roof air conditioning load. The operating cost of the system in the form of the water used, is about 15% of the savings attained from the reduction of the air conditioner operating cost. Electrical power usage for the system is essentially zero.

It should be noted that where the evaporative roof cooling of the present invention is to be utilized in association with new building construction, the pipes utilized throughout the system need not be made of more costly ultra-violet stabilized PVC material if located below the roof surface. In such cases, riser pipes extending through the roof to support nozzles should be of UV stabilized PVC. Additionally, it should be understood that in many communities, building codes may require that roof piping systems include a "back-flow" valve.

In the specification and drawing figures there has been set forth a preferred embodiment of apparatus and methodology for the evaporative cooling of roofs by water sprays to reduce interior air conditioner loads and effect substantial cost savings. Although specific terms have been employed in describing the invention, they are used in a generic and descriptive sense only and not for purposes of limitation, the scope of the invention being defined in the following claims.

What is claimed is:

1. An evaporative roof cooling system for placement upon a roof surface exposed to relatively high levels of solar radiation causing high under roof temperatures and comprising:
   (a) a plurality of water distribution mist/spray nozzles positioned on said roof surface for supplying substantially uniform mist/sprays of water thereto to lay down a substantially uniform thin film of water on said roof surface;
   (b) conduit means on said one said roof surface for supplying said nozzles with water;
   (c) solenoid-controlled valve means in water flow communication with said conduit means to supply controlled quantities of water to said nozzles through said conduit means over periods during which the temperature of said roof surface is measured to be within a predetermined temperature range;
   (d) temperature measurement means comprised of a thermistor encapsulated in an epoxy block in direct contact with said roof surface for monitoring and measuring the actual temperature of said surface substantially by thermal conductivity and developing an electrical resistance value in direct relationship with the temperature of said surface, said temperature measurement means having a solar radiation reflective cover protecting said means from direct solar radiation heating thereof and being affixed to said roof surface by a like epoxy adhesive; and
   (e) cooling system control means in electric comunication with the temperature measurement means for comparing the electric resistance value developed by said temperature measurement means and a range of current values related to said predetermined temperature range, said control means including pulse action timer means in electric communication with the solenoid-controlled valve means for initiating the cyclic pulse opening and closing of said valve when the electric resistance value developed by said temperature measurement means reaches or exceeds the high point of said predetermined temperature range and for terminating the cyclic pulse opening and closing of said valve when the electric resistance value developed by said temperature measurement means reaches the low point of said predetermined temperature range whereby the cyclically pulsed mist/sprays of water discharged from said nozzles evaporatively cool the roof surface between the high point and the low point of said temperature range and whereby puddling of water on said roof surface is substantially avoided and evaporative efficiency is increased.

2. The evaporative roof cooling system as claimed in claim 1 wherein the pulse action timer means cyclically pulses the opening and closing of the solenoid-controlled valve means for periods of from 0.5 to 1.5 minutes per cycle over the period from initation of the cyclic pulse opening and closing of said valve to the termination of the cyclic pulse opening and closing of said valve.

3. The evaporative roof cooling system as claimed in claim 1 wherein said mist/spray nozzles are desinged and oriented to provide mist/sprays of water above said roof to intercept in part solar radiation before it reaches the roof surfaces.

4. The evaporative roof cooling system as claimed in claim 1 wherein said system cools said roof surface to within 10° to 12° F. of the wet bulb temperature in the vicinity of said surface.

* * * * *